UNITED STATES PATENT OFFICE.

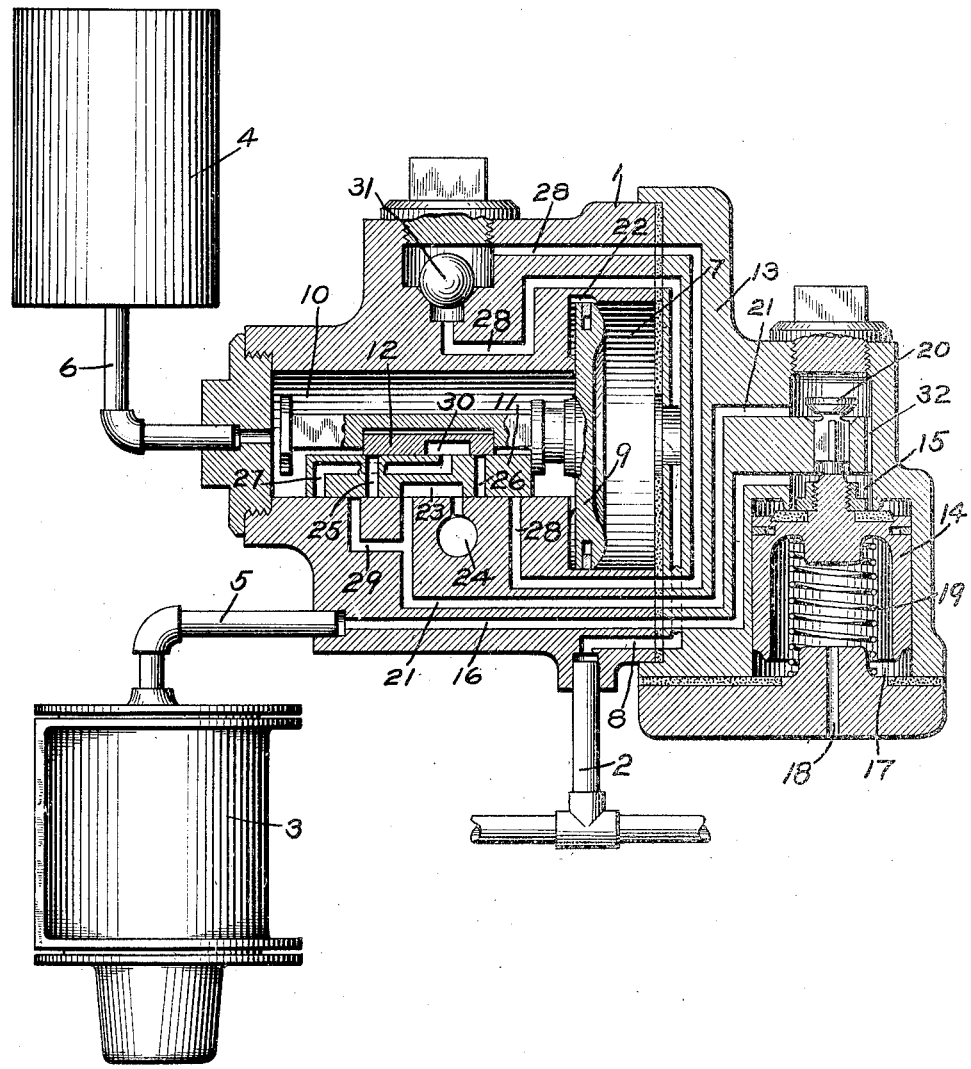

HENRY HERMAN WESTINGHOUSE, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,390,597.  Specification of Letters Patent.  Patented Sept. 13, 1921.

Application filed June 14, 1919. Serial No. 304,123.

*To all whom it may concern:*

Be it known that I, HENRY HERMAN WESTINGHOUSE, of the borough of Manhattan, in the city, county, and State of New York, have invented certain new and useful Improvements in Fluid-Pressure Brakes, of which the following is a specification.

This invention relates to fluid pressure brakes, and more particularly to a triple valve device for controlling the application and the release of the brakes.

With an automatic fluid pressure brake system, the brakes are applied first at the head end and then serially throughout the train to the rear end, according to the rate at which the brake pipe reduction travels back, and while means have heretofore been provided for accelerating the rate at which the reduction in brake pipe pressure travels through the train, it may still happen that on long trains, the braking pressure built up on the cars at the head end of the train may exceed that on the cars at the rear end sufficiently to permit of the slack running in with such force as to cause dangerous shocks.

The principal object of my invention is to provide means for securing a more nearly uniform application of the brakes throughout the train.

In the accompanying drawing, the single figure is a sectional view of a car brake apparatus embodying my invention.

As shown in the drawing, the apparatus may comprise a triple valve device 1, connected to the usual automatic brake pipe 2, a brake cylinder 3, and an auxiliary reservoir 4, connected by the respective pipes 5 and 6 to the triple valve device 1.

According to my invention, the triple valve device is adapted to make substantially its full traverse in service applications of the brakes and does not have an emergency application position nor the quick action function, but is provided with means for securing quick service applications of the brakes.

As shown in the drawing, the triple valve device 1 may comprise a casing, having a piston chamber 7 connected by passage 8 to brake pipe 2 and containing the usual triple valve piston 9 and a valve chamber 10, connected to auxiliary reservoir 6 and containing a main slide valve 11, and a graduating slide valve 12, adapted to be operated by piston 9.

Preferably in the triple valve cap 13, there is provided a valve piston 14 having the chamber 15 at one side connected by passage 16 with the brake cylinder 3, and the chamber 17 at the opposite side connected to an atmospheric exhaust port 18, the chamber 17 containing a coil spring 19 adapted to act on said valve piston.

The valve piston 14 is adapted to normally hold a check valve 20 off its seat so as to establish communication between the brake cylinder passage 16 and a passage 21, leading to the seat of slide valve 11.

In operation, fluid under pressure, supplied to the brake pipe 2, flows to the piston chamber 7 and thence through the usual feed groove 22 around the triple valve piston 9 to the valve chamber 10, charging the auxiliary reservoir 4 with fluid under pressure.

The parts being in normal release position, the brake cylinder 3 is connected to the exhaust through passage 16, past the open check valve 20 to passage 21, and thence through cavity 23 in slide valve 11 to exhaust port 24.

Upon reducing the brake pipe pressure to effect an application of the brakes, the piston 9 is moved outwardly by the higher auxiliary reservoir pressure until the service port 25 commences to register with passage 21 and at the same time a port 26 and a port 27 commence to register with the respective passages 28 and 29.

The ports 26 and 27 having been connected through cavity 30 in the graduating valve 12 by the preliminary movement of piston 9, fluid is vented from the brake pipe 2 to the brake cylinder, through passage 28, past check valve 31, through port 26, cavity 30, port 27, and passage 29 to passage 21, and thence past check valve 20 to brake cylinder passage 16, to produce a local quick service venting of fluid from the brake pipe to the brake cylinder on each car of the train. At the same time, fluid is supplied from valve chamber 10 and the auxiliary reservoir 4, through port 25 and passage 21 to the brake cylinder.

When, by flow of the fluid from the auxiliary reservoir and the brake pipe to the brake cylinder, the brake cylinder pressure has been increased to a predetermined degree, preferably sufficient to move the brake cylinder piston out to application position, the pressure of the spring 19 will be overcome by the brake cylinder pressure acting on the exposed restricted seated area of the valve piston 14 and then the valve piston will be moved from its seat, so as to expose the full area thereof to brake cylinder pressure.

The prompt movement of the valve piston 14 to its outer seat is then effected and this permits the closing of the check valve 20 on its seat.

Further flow of fluid to the brake cylinder must now take place through a restricted port 32, which is of such limited area that the further build up of pressure in the brake cylinder will be slow enough at the head end of the train to allow for the building up of brake cylinder pressure on the cars at the rear end of the train.

By this means, the brake cylinder pressure at the head end of the train is prevented from rising at such a rate in advance of the rise in brake cylinder pressure on the cars at the rear end of the train, as to cause dangerous shocks.

Having now described my invention, what I claim as new, and desire to secure by Letters Patent, is:—

In a fluid pressure brake, the combination with a brake pipe, a brake cylinder, an auxiliary reservoir, and a triple valve device adapted to make its full traverse in a service application of the brakes and comprising a piston and valve means operated upon a reduction in brake pipe pressure for venting fluid from the brake pipe and the auxiliary reservoir to the brake cylinder, of a valve device normally providing a large opening through which fluid is supplied from the triple valve device to the brake cylinder and operated at a predetermined brake cylinder pressure for closing said opening, a restricted port being provided through which fluid is supplied to the brake cylinder when said large opening is closed.

In testimony whereof I have hereunto set my hand.

HENRY HERMAN WESTINGHOUSE.